J. RANCOURT.
THERMOSTATIC FIRE ALARM.
APPLICATION FILED MAY 3, 1913.
1,078,063.
Patented Nov. 11, 1913.
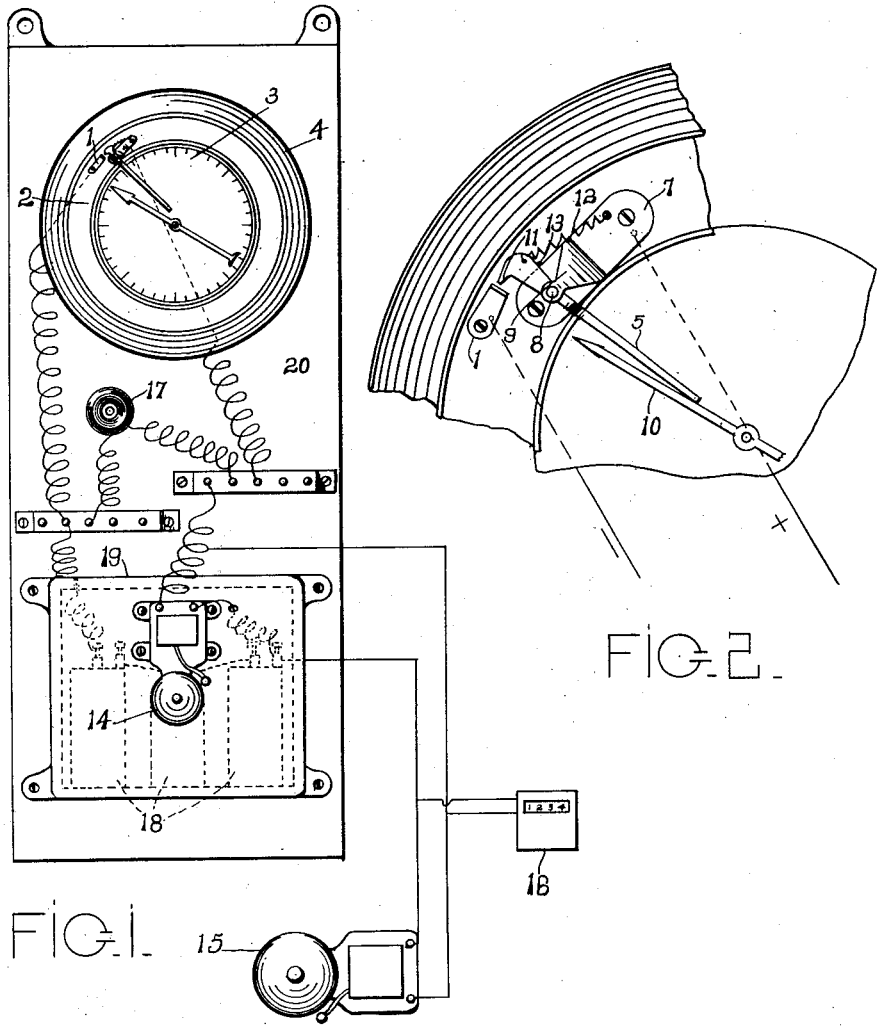
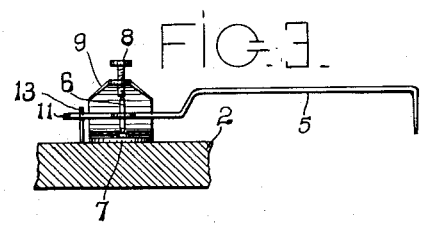
Witnesses:
Henry H. Babcock.
Joseph Rancourt.
Inventor
By
Attorneys

UNITED STATES PATENT OFFICE.

JOSEPH RANCOURT, OF ST. BENOIT, QUEBEC, CANADA.

THERMOSTATIC FIRE-ALARM.

1,078,063. Specification of Letters Patent. Patented Nov. 11, 1913.

Application filed May 3, 1913. Serial No. 765,181.

*To all whom it may concern:*

Be it known that I, JOSEPH RANCOURT, a subject of the King of Great Britain, residing at St. Benoit, Beauce county, Province of Quebec, Canada, have invented certain new and useful Improvements in Thermostatic Fire-Alarms; and I do hereby declare that the following is a full, clear, and exact description of the invention, such as will enable others skilled in the art to which it appertains to make and use the same.

The invention to be hereinafter described relates to thermostatic fire alarms.

In order to more clearly disclose the construction, operation, and use of the invention, reference should be had to the accompanying drawings forming part of the present application.

Throughout the several figures of the drawings like reference characters designate the same parts.

In the drawings: Figure 1 is a plan view of an alarm, as connected up in a system, with the circuit closing device complete; Fig. 2 is a detail of the circuit closing device; and Fig. 3 is a detail in side elevation of the circuit closing arm.

The main object of the invention is to provide simple and efficient means for closing the circuit of an alarm circuit when the indicator needle of the thermostat revolves to a predetermined point on the dial.

Referring to the drawings in detail, 1 designates a brass plate turned upward at its free end and fixedly secured to the outer face of a ring 2 in which is mounted the dial 3 of the thermostat 4. A metal arm 5 is secured to a steel shaft 6 which is mounted in needle point bearings in a fixed metal plate 7 and in a regulating screw 8 threaded through an arched plate 9 integral with plate 7. The inner end of arm 5 is bent downward so as to be engaged by the indicator needle 10 and revolved on its pivot so that a suitable point 11 on the center end of the arm is forced into contact with plate 1 against the action of a fine tension spring 12 secured to the outer end of the arm and to plate 7, as shown. The motion of arm 5 is limited by a pin 13. As the plates 1 and 7 are connected up to opposite sides of an electric circuit it is evident that as soon as the plate 1 and arm 5 contact, the circuit will be completed, thus sounding the alarm. The circuit is provided with a local alarm 14 and connected to a central alarm 15, connected up to an annunciator 16 which indicates where the alarm is sent from.

A test button 17 is provided to determine if the system is operating.

The thermostat 4, local alarm 14, battery 18, battery casing 19, test button 17, and the local connections are all mounted on a suitable hanger board 20 in order to enable the device to be quickly and easily placed in the local station such as an apartment or the like.

It is thought that the construction, operation, and use of the invention will be clear from the preceding detailed description.

Changes may be made in the construction, arrangement, and disposition of the several parts of the invention, without in any way departing from the field and scope of the same, and it is meant to include all such within this application wherein only a preferred form has been disclosed.

Having thus fully described my invention, what I claim as new and desire to secure by Letters Patent is:

In combination in a device of the character described, an electrical circuit, a needle, a fixed plate connected to one side of the circuit; a flat fixed plate connected to other side of the circuit; an arched plate integral with the flat plate, a regulating screw threaded through the arched plate, a shaft having its ends mounted in needle point bearings in the said screw and the flat plate, an arm secured on the shaft and having its inner end bent downwardly and its outer end provided with a point adapted to engage the first mentioned fixed plate as it is rotated by the action of the needle on its inner downwardly bent end and thus close the circuit; a tension spring having one end connected to the outer end of the arm and the other end connected to the flat fixed plate, so as to keep the circuit normally open; and a pin adapted to engage the outer end of the arm so as to limit its motion away from the first fixed plate.

In witness whereof I have hereunto set my hand in the presence of two witnesses.

JOSEPH RANCOURT.

Witnesses:
L. A. GAUVIN,
A. BASTIEN.